United States Patent
Kurita

(10) Patent No.: US 9,504,128 B2
(45) Date of Patent: Nov. 22, 2016

(54) IMAGE DISPLAY DEVICE AND CONTROL METHOD THEREOF

(71) Applicant: CANON KABUSHIKI KAISHA, Tokyo (JP)

(72) Inventor: Masanao Kurita, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 151 days.

(21) Appl. No.: 14/323,160

(22) Filed: Jul. 3, 2014

(65) Prior Publication Data

US 2015/0015146 A1    Jan. 15, 2015

(30) Foreign Application Priority Data

Jul. 10, 2013   (JP) .................................. 2013-144897
Jun. 12, 2014   (JP) .................................. 2014-121458

(51) Int. Cl.
| | | |
|---|---|---|
| H05B 37/02 | (2006.01) | |
| H05B 33/08 | (2006.01) | |
| G09G 3/34 | (2006.01) | |
| G09G 3/36 | (2006.01) | |

(52) U.S. Cl.
CPC ........ H05B 37/0218 (2013.01); G09G 3/3413 (2013.01); H05B 33/086 (2013.01); G09G 3/36 (2013.01); G09G 2360/144 (2013.01); G09G 2360/145 (2013.01); Y02B 20/46 (2013.01)

(58) Field of Classification Search
CPC .................. G09G 2360/144; G09G 2360/145
USPC ........................................................ 315/152
See application file for complete search history.

(56) References Cited

U.S. PATENT DOCUMENTS

| | | | | |
|---|---|---|---|---|
| 2012/0212466 A1* | 8/2012 | Kohtoku | ........... | G02F 1/133385 345/207 |
| 2012/0268437 A1* | 10/2012 | Lee | ........... | G09G 3/20 345/207 |
| 2014/0034926 A1* | 2/2014 | Matsubara | ........... | H01L 51/504 257/40 |
| 2014/0300625 A1* | 10/2014 | Chun | ........... | G09G 5/02 345/600 |
| 2015/0199934 A1* | 7/2015 | Kimura | ........... | G01J 1/32 345/690 |

FOREIGN PATENT DOCUMENTS

| | | |
|---|---|---|
| JP | 2009-080382 A | 4/2009 |
| JP | 2010-191286 A | 9/2010 |
| JP | 2011-027941 A | 2/2011 |
| JP | 2012-037540 A | 2/2012 |
| JP | 4875590 B2 | 2/2012 |

OTHER PUBLICATIONS

Apr. 21, 2015 Japanese Office Action that issued in Japanese Patent Application No. 2014-121458.

* cited by examiner

*Primary Examiner* — Don Le
(74) *Attorney, Agent, or Firm* — Cowan, Liebowitz & Latman, P.C.

(57) ABSTRACT

An image display device including: a light-emitting unit; a display panel including color filters of a plurality of colors and pixels corresponding to the respective color filters; a sensor which detects light from the light-emitting unit and light incident from outside; an acquisition unit configured to acquire, in a state where the display panel is controlled so that, relative to transmittance of pixels of one color among the plurality of colors, transmittance of pixels of colors other than the one color becomes smaller, a detection value that is output from the sensor; and a determination unit configured to determine an irradiation condition of external light based on the detection value of each color of the plurality of colors acquired by the acquisition unit.

21 Claims, 15 Drawing Sheets

|  | ON/OFF OF LIQUID CRYSTAL CELL | | |
|---|---|---|---|
|  | R SUB PIXEL | G SUB PIXEL | B SUB PIXEL |
| DETECTION OF INFRARED LIGHT COMPONENT OF OUTSIDE LIGHT | OFF | OFF | OFF |
| DETECTION OF RED COMPONENT (+INFRARED LIGHT COMPONENT) OF OUTSIDE LIGHT | ON | OFF | OFF |
| DETECTION OF GREEN COMPONENT (+INFRARED LIGHT COMPONENT) OF OUTSIDE LIGHT | OFF | ON | OFF |
| DETECTION OF BLUE COMPONENT (+INFRARED LIGHT COMPONENT) OF OUTSIDE LIGHT | OFF | OFF | ON |

*Fig.6*

| | DETECTION VALUE OF OPTICAL SENSOR | | | |
|---|---|---|---|---|
| | LED LAMP (DAYLIGHT COLOR) | LED LAMP (LIGHT BULB COLOR) | INCANDESCENT LAMP (LIGHT BULB) | SUNLIGHT |
| INFRARED COMPONENT OF OUTSIDE LIGHT | 5 | 10 | 100 | 50 |
| RED COMPONENT OF OUTSIDE LIGHT | 60 | 100 | 50 | 60 |
| GREEN COMPONENT OF OUTSIDE LIGHT | 80 | 80 | 30 | 100 |
| BLUE COMPONENT OF OUTSIDE LIGHT | 100 | 60 | 20 | 60 |

Fig.7

IMAGE DISPLAY DEVICE AND CONTROL METHOD THEREOF

BACKGROUND OF THE INVENTION

1. Field of the Invention

The present invention relates to an image display device and a control method thereof.

2. Description of the Related Art

Among image display devices, there are types that include a liquid crystal panel with a color filter, and a light source device (backlight device) that emits white light to the rear surface of the liquid crystal panel.

A backlight device has a problem in that the brightness from the light source changes. Change in the brightness is caused by, for example, changes in the emission characteristics of the light source due to changes in the temperature, aging deterioration of the light source, among other reasons. With a light-emitting device including a plurality of light sources, brightness variation (brightness unevenness) of the plurality of light sources will arise due to variations in the temperature and aging deterioration level of the plurality of light sources.

As a method of alleviating the foregoing brightness change or brightness unevenness, known is a method of measuring the brightness of the light source using an optical sensor, and adjusting the amount of luminescence of the light source based on feedback. Specifically, known is a method of providing an optical sensor that detects, of the light emitted from the backlight device, reflected light that is reflected off an optical sheet (optical member) of the backlight device and returns to the light source side, and adjusting the amount of luminescence (light emission control value) of the light source based on the detection value of the optical sensor. This type of technique is disclosed, for example, in Japanese Patent Application Publication No. 2011-27941.

As an optical image that is used in an image display device, known is an external light sensor that detects the user's environmental light (external light of lamps or the like). As an external light sensor, there is a type that is disposed on a frame (bezel part) of the display screen, and detects the luminance and color of the external light. Japanese Patent No. 4875590 discloses an example of this type of external light sensor.

SUMMARY OF THE INVENTION

Nevertheless, providing an external light sensor to an image display device is one cause that increases the cost of parts. Moreover, when an external light sensor is disposed on the bezel part, the size of the bezel part needs to be enlarged in order to secure the space for mounting the external light sensor, and there are cases where it is not possible to sufficiently meet the demands of achieving a thinner and smaller image display device.

Thus, the present invention provides a technology which enables the detection of environmental light (external light) without having to separately providing an external light sensor in an image display device comprising a sensor for measuring the optical characteristics of a backlight light source.

The first aspect of the present invention is an image display device, including: a light-emitting unit; a display panel including color filters of a plurality of colors and pixels corresponding to the respective color filters; a sensor which detects light from the light-emitting unit and light incident from outside that passes through the display panel; an acquisition unit configured to acquire, in a state where the display panel is controlled so that, relative to transmittance of pixels of one color among the plurality of colors, transmittance of pixels of colors other than the one color becomes smaller, a detection value that is output from the sensor as a first detection value of the one color; and a determination unit configured to determine an irradiation condition of external light based on the first detection value of each color of the plurality of colors acquired by the acquisition unit.

The second aspect of the present invention is a method of controlling an image display device including: a light-emitting unit; a display panel including color filters of a plurality of colors and pixels corresponding to the respective color filters; and a sensor which detects light from the light-emitting unit and light incident from outside that passes through the display panel, the method including: acquiring, in a state where the display panel is controlled so that, relative to transmittance of pixels of one color among the plurality of colors, transmittance of pixels of colors other than the one color becomes smaller, a detection value that is output from the sensor as a first detection value of the one color; and determining an irradiation condition of external light based on the first detection value of each color of the plurality of colors acquired in the acquiring.

According to the present invention, it is possible to detect environmental light (external light) without having to separately providing an external light sensor in an image display device comprising a sensor for measuring the optical characteristics of a backlight light source.

Further features of the present invention will become apparent from the following description of exemplary embodiments (with reference to the attached drawings).

BRIEF DESCRIPTION OF THE DRAWINGS

FIG. 6 is a list showing an example of the control method of Embodiment 1;

FIG. 7 is a table showing an example of the optical sensor detection values of Embodiment 1;

DESCRIPTION OF THE EMBODIMENTS

Embodiment 1

An image display device according to Embodiment 1 of the present invention is now explained. Note that, while this embodiment will be explained by taking an image display device including a liquid crystal panel with a color filter, and a backlight device as an example, the configuration may also use other members having equivalent functions.

Figure 13:
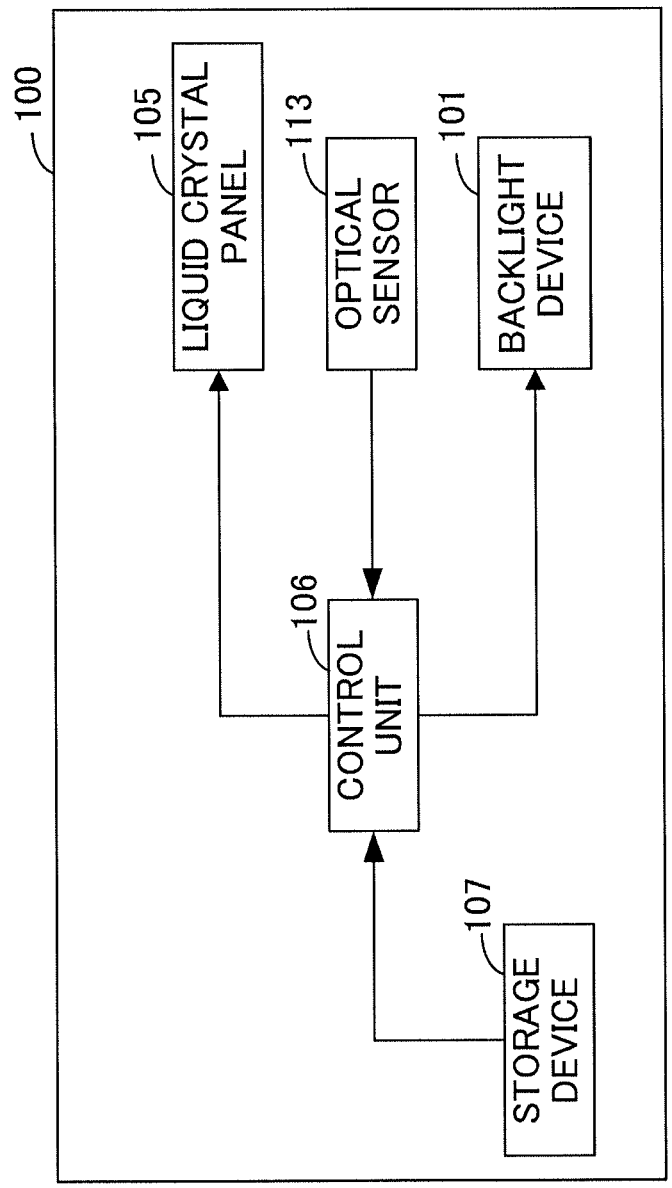
FIG. 13 is a functional block diagram of the image display device according to an embodiment.

FIG. 13 is a functional block diagram of an image display device 100 according to this embodiment. The image display device 100 includes a liquid crystal panel 105, a control unit 106, a storage device 107, a backlight device 108, and an optical sensor 113. The control unit 106 acquires a detection value that is output from the optical sensor 113, and determines the conditions of external light (type, intensity, incident angle and the like) that enters the image display device 100 based on the acquired detection value. The control unit 106 reads various types of pre-stored information from the storage device 107, and performs the determination processing based on the foregoing information and the detection value acquired from the optical sensor 113.

The control unit 106 corrects the image signal (image data) to be output to the liquid crystal panel 105 and performs light emission control of the backlight device 108 based on the determined external light conditions. The control unit 106 performs processing for outputting a predetermined patch image to the liquid crystal panel 105 and performs light emission control so that the backlight device 108 does not emit light upon acquiring the detection value from the optical sensor 113. Details of the foregoing control and respective blocks will be described later.

Figure 1:
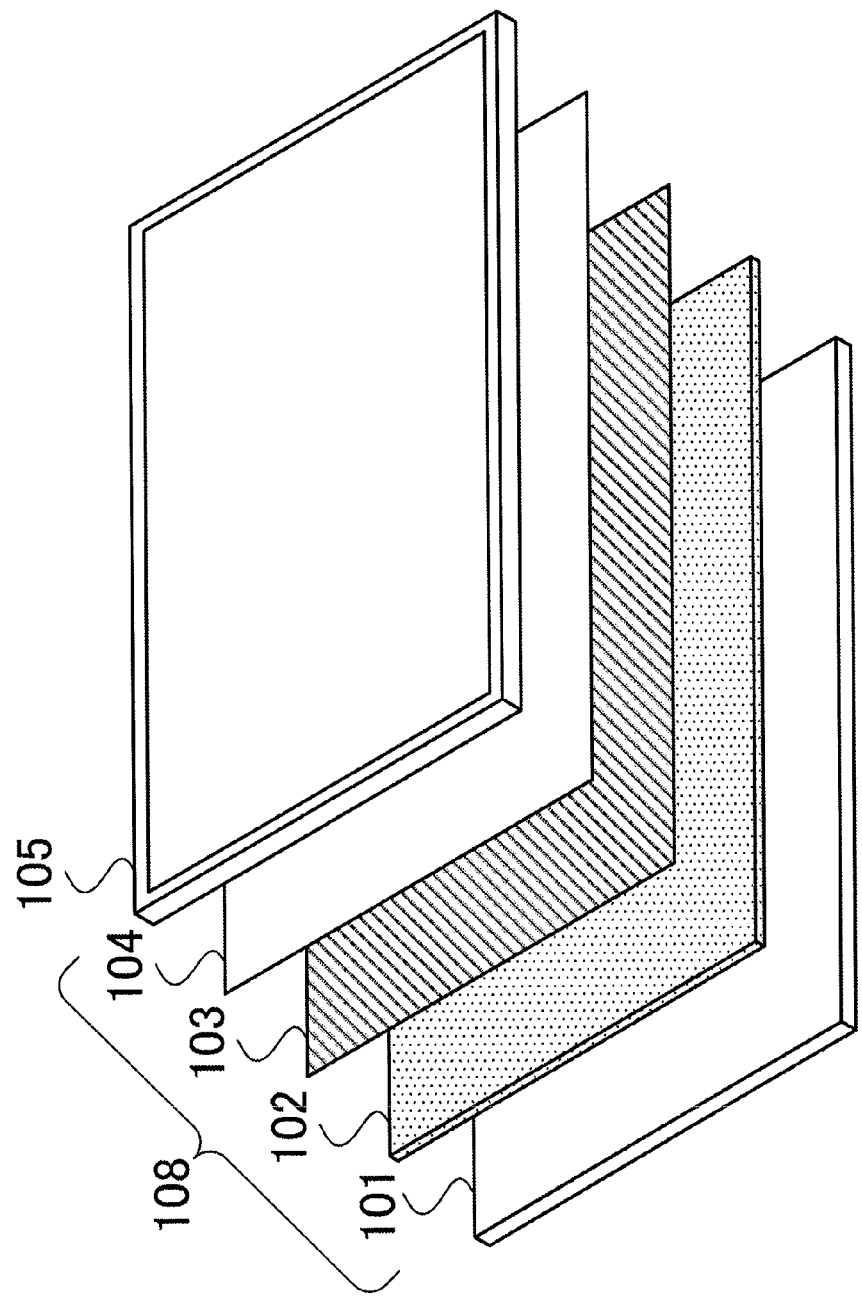
FIG. 1 is a schematic diagram showing an example of the configuration of the image display device of Embodiment 1.

FIG. 1 is a schematic diagram showing an example of the configuration of the backlight device 108 according to this embodiment. The backlight device 108 includes a light source substrate 101, a diffuser panel 102, a light condensing sheet 103, and a reflective polarization film 104. The backlight device 108 is disposed on the rear face of the liquid crystal panel 105.

The light source substrate 101 emits light (white light) that is emitted to the rear surface of the liquid crystal panel 105. The light source substrate 101 is provided with a plurality of light-emitting members (light-emitting elements, light-emitting bodies). As the light-emitting members, used may be light-emitting diodes (LEDs), cold-cathode tubes, organic EL elements or the like. In this embodiment, an LED is used as the light-emitting member.

The diffuser panel 102, the light condensing sheet 103, and the reflective polarization film 104 of FIG. 1 are disposed in parallel with the light source substrate 101, and optically change the light from the light source substrate 101. Specifically, the diffuser panel 102 causes the light source substrate 101 to function as a surface light source by reflecting and diffusing the light from the plurality of light-emitting members (LED chips in this embodiment) described above.

Note that the image display device to which the present invention is applied may include members other than the foregoing optical members, and does not necessarily need to comprise all of the foregoing optical members.

The liquid crystal panel 105 is a display panel configured from a plurality of pixels, wherein the respective pixels are R sub pixels that transmit red light, G sub pixels that transmit green light, and B sub pixels that transmit blue light. The respective pixels display a color image by controlling, for each sub pixel, the transmittance of the white light irradiated from the backlight device 108.

A backlight device configured as shown in FIG. 1 explained above is generally referred to as a direct backlight device.

Figure 2:
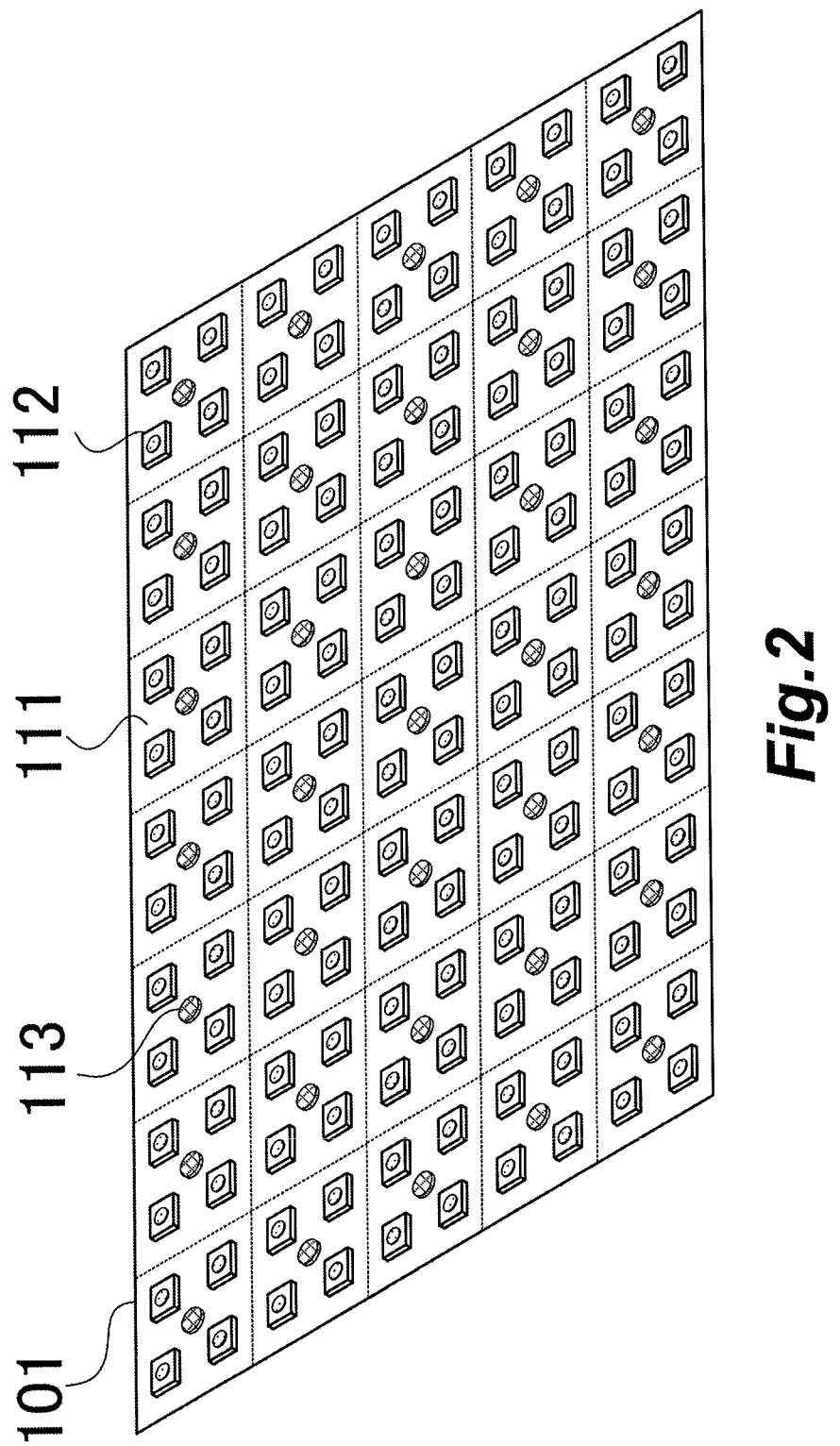
FIG. 2 is a schematic diagram showing an example of the configuration of the light source substrate of Embodiment 1.

FIG. 2 is a schematic diagram showing an example of the configuration of the light source substrate 101.

The light source substrate 101 is configured from a plurality of light sources 111. Each light source 111 is provided with a plurality of light-emitting members (LED chips 112). As the LED chips 112, used may be, for example, white LEDs that emit white light. The light source 111 may also be configured to obtain white light as synthetic light of light of a plurality of colors by using a plurality of LEDs that emit light of different colors (for example, red LEDs that emit red light, green LEDs that emit green light, and blue LEDs that emit blue light) as the LED chips 112.

Each light source 111 is provided with an optical sensor 113 for detecting light and outputting a detection value. A part of the light from the light sources 111 is reflected by a diffuser panel or a reflective polarization film, and returned to the light source-side. The optical sensor 113 detects the reflected light that was reflected by the diffuser panel or reflective polarization film and returned to the light source-side. Brightness of the light sources 111 can be detected from the brightness of the reflected light. By performing feedback control to the amount of luminescence of the light sources 111 according to the detection result, it is possible to suppress the brightness unevenness caused by variations in the temperature and aging deterioration level of the light sources 111.

In this embodiment, the optical sensor 113 provided to the light source 111 is used for detecting environmental light (external light of lamps or the like) in addition to the usage explained above (feedback control of the amount of luminescence of the light source 111). The method of detecting environmental light with the optical sensor 113 will be explained later.

Figure 3:
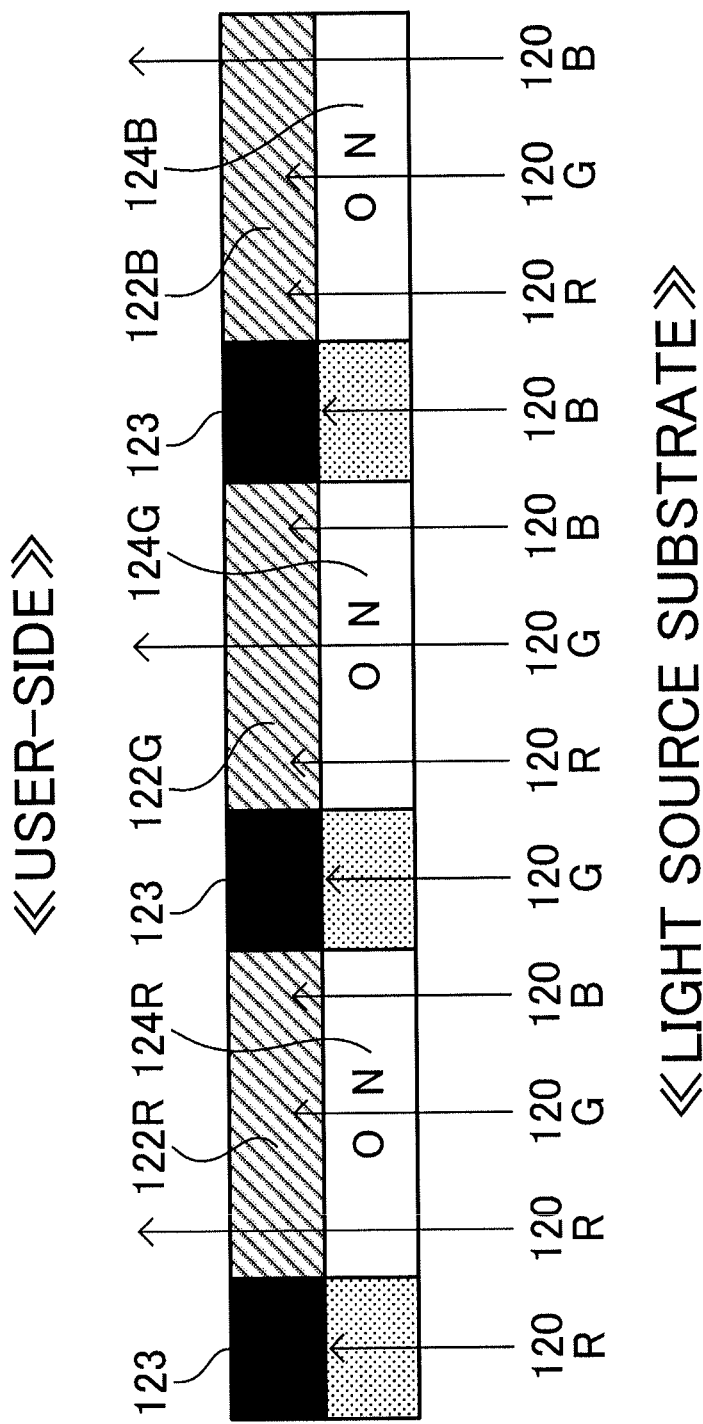
FIG. 3 is a cross section showing an example of the liquid crystal panel of Embodiment 1.

FIG. 3 is a diagram showing an enlarged view of one pixel in the schematic cross section of the liquid crystal panel 105.

One pixel of the liquid crystal panel 105 is configured from R sub pixels that transmit red light, G sub pixels that transmit green light, and B sub pixels that transmit blue light. The R sub pixels are configured from an R color filter 122R and an R liquid crystal cell 124R. The G sub pixels are configured from a G color filter 122G and a G liquid crystal cell 124G. The B sub pixels are configured from a B color filter 122B and a B liquid crystal cell 124B.

A black matrix (hereinafter referred to as "BM") 123 is a frame that partitions the sub pixels, and does not transmit visible light. Meanwhile, the BM 123 transmits infrared light having a wavelength that is longer than that of visible light. The reason why the BM 123 is given the foregoing characteristics is to perform the positioning of the infrared light upon printing the BM 123 during the production process. The infrared light used in the explanation of this embodiment may be infrared light that also contains near-infrared.

Upon displaying an image on the liquid crystal panel 105, transmittance of the white light irradiated from the light source substrate 101 is controlled for each liquid crystal cell of the sub pixels. A color image can thereby be observed when viewed from the user-side (observer-side of the image display device).

The white light irradiated from the light source substrate 101 contains a red component 120R of light, a green component 120G of light, and a blue component 120B of light.

As shown in FIG. 3, when control is performed for turning ON the R liquid crystal cell 124R of the R sub pixels so as to transmit light, while the white light irradiated from the light source substrate 101 passes through the R liquid crystal cell 124R, only the red component 120R of light passes through the R color filter 122R. Red is thereby displayed with the R sub pixels. Similarly, when the G liquid crystal cell 124G of the G sub pixels is turned ON, green is displayed, and when the B liquid crystal cell 124B of the B sub pixels is turned ON, blue is displayed.

While the liquid crystal panel 105 includes a transparent electrode, a polarization film and the like in addition to the illustrated components, the illustration of such transparent electrode and polarization film are omitted in the diagrams.

In this embodiment, environmental light (external light of lamps or the like) is detected with the optical sensor 113 provided to the light source 111 by using the features of the liquid crystal panel 105 explained above.

Figure 4A:
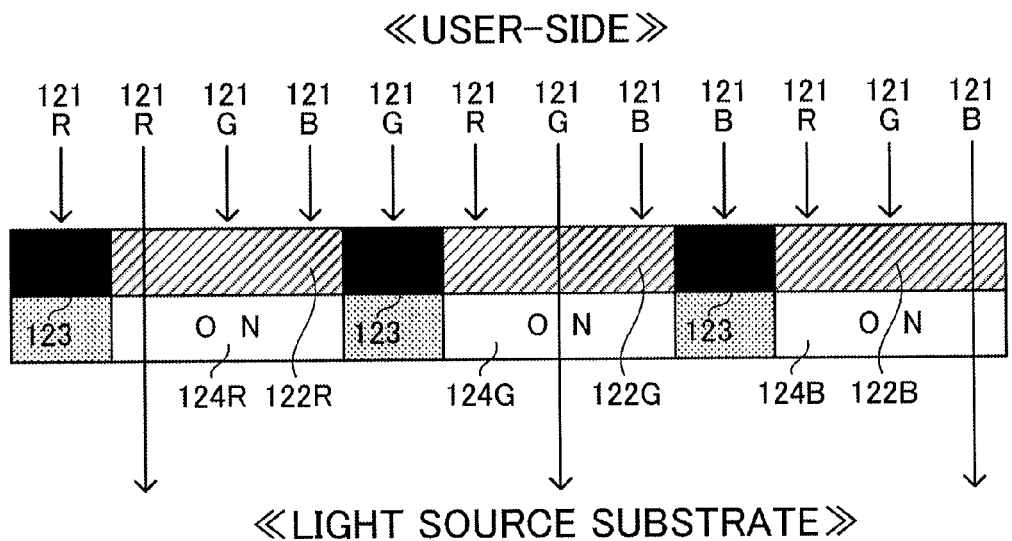
FIG. 4A and FIG. 4B are cross sections showing an example of the liquid crystal panel of Embodiment 1.
Figure 4B:
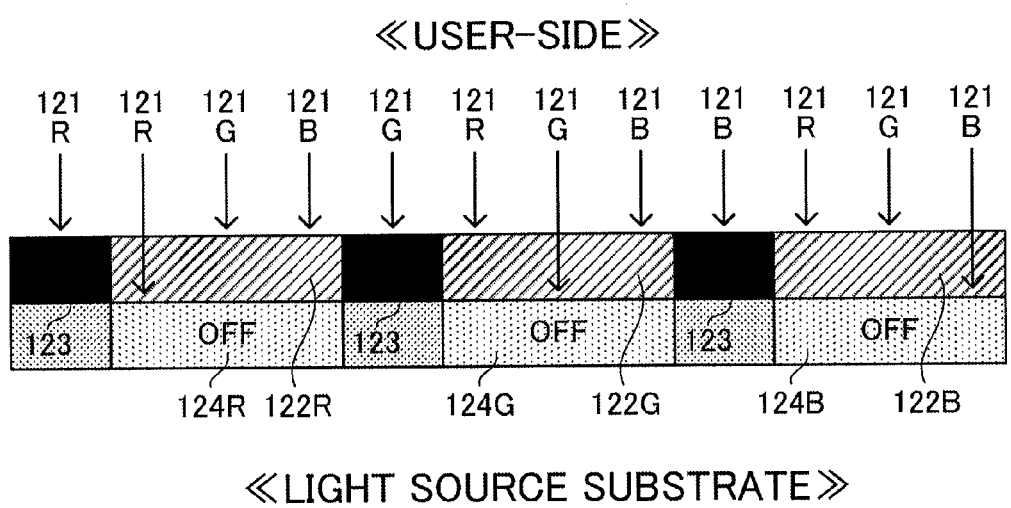

FIG. 4A and FIG. 4B are cross sections showing the transmittable state of the liquid crystal panel 105 in a case where visible light components of external light enter from the user-side.

FIG. 4A shows a state when the liquid crystal cells of the respective pixels are turned ON.

The red component 121R of external light passes through the R color filter 122R, but does not pass through the color filters of other colors or the BM 123. When the R liquid crystal cell 124R of the R sub pixels is ON, only the red component 121R of external light passes through the R liquid crystal cell 124R, and is detected by the optical sensor 113 provided to the light source substrate 101. Similarly, when the G liquid crystal cell 124G of the G sub pixels is ON, only the green component 121G of external light is detected by the optical sensor 113. When the B liquid crystal cell 124B of the B sub pixels is ON, only the blue component 121B of external light is detected by the optical sensor 113.

FIG. 4B shows a state where the liquid crystal cells of the respective pixels are turned OFF. Since visible light that passed through the respective color filters does not pass through the liquid crystal cells, it is not detected by the optical sensor 113 provided to the light source substrate 101.

Consequently, it can be understood that components of the relevant color in the external light are detected when the liquid crystal cells of the sub pixels of the respective colors are turned ON, and are not detected when turned OFF. In other words, the detection value of the red component, the green component, and the blue component of the external light is strongly dependent on the gradation of the liquid crystal panel.

Figure 5A:
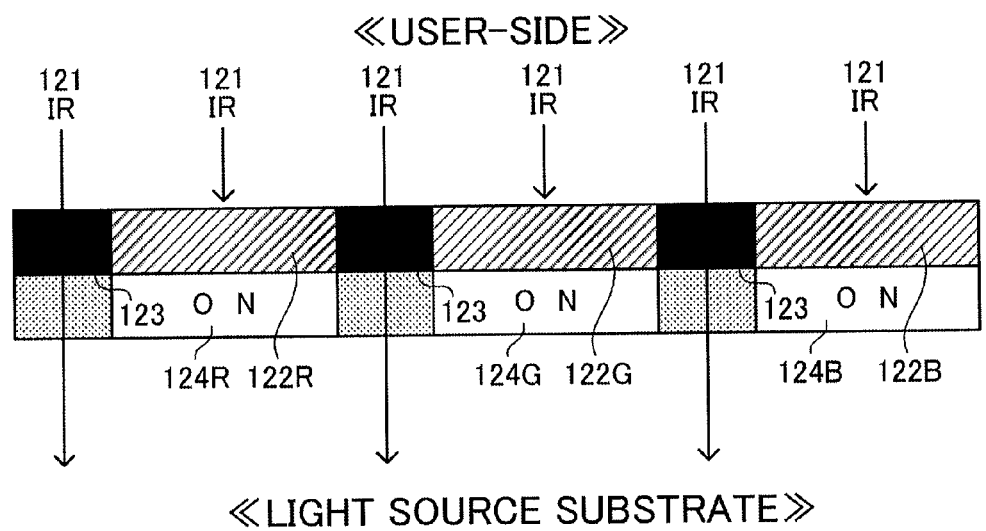
FIG. 5A and FIG. 5B are cross sections showing an example of the liquid crystal panel of Embodiment 1.
Figure 5B:
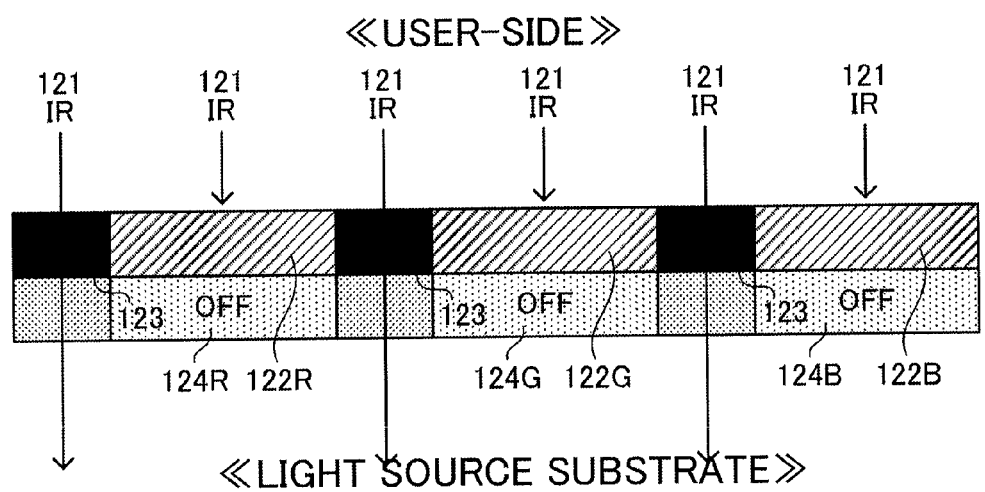

FIG. 5A and FIG. 5B are cross sections showing the transmittable state of the liquid crystal panel 105 when infrared light components of the external light enter from the user-side.

FIG. 5A shows a state when the liquid crystal cells of the respective pixels are turned ON.

An infrared light component 121IR of external light hardly passes through the color filters of the respective colors such as the R color filter 122R. Meanwhile, since the BM 123 transmits the infrared light component 121IR, the infrared light component 121IR is detected by the optical sensor 113 provided to the light source substrate 101.

FIG. 5B shows a state when the liquid crystal cells of the respective pixels are turned OFF. Similar to FIG. 5A, the infrared light component 121IR of external light only passes through the BM 123, and is detected by the optical sensor 113.

Consequently, it can be understood that the infrared light component 121IR of external light is detected by the optical sensor 113 irrespective of the ON/OFF of the liquid crystal cells. In other words, it can be understood that the detection value of the infrared light component of external light is not dependent on the gradation of the liquid crystal panel.

Figure 14:
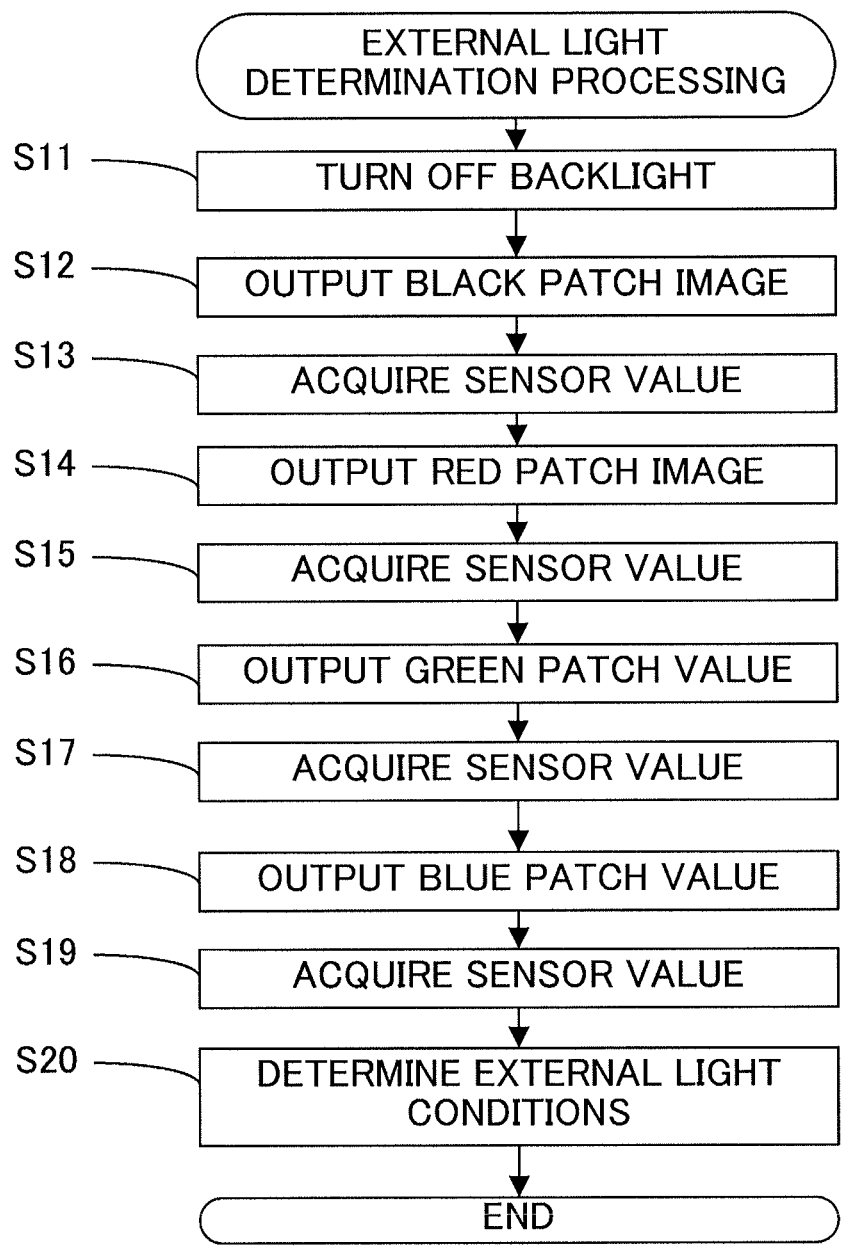
FIG. 14 is a flowchart of the external light determination processing of Embodiment 1.

FIG. 6 is a list that summarizes the control method upon detecting external light with the optical sensor 113 provided to the light source substrate 101. FIG. 14 is a flowchart of the processing (external light determination processing) for determining the irradiation condition of the external light to be performed by the control unit 106. The external light determination processing of this embodiment is now explained based on the foregoing diagrams.

The control unit 106 turns off the backlight device 108 upon performing the external light determination processing (S11). The reason why the light sources 111 of the light source substrate 101 are turned off upon detecting external light is because the light sources 111 are located near the optical sensor 113, and considerably affect the detection value. Moreover, the transmittance of liquid crystals is generally low at 10% or less, and the amount of external light that can actually be detected by the optical sensor 113 is small.

Subsequently, the control unit 106 detects the infrared light component of the external light. The control unit 106 causes the liquid crystal cells of all pixels to be in an OFF state. In other words, the control unit 106 outputs a black patch image to the liquid crystal panel 105 (S12). The control unit 106 acquires a detection value (second detection value) that is output from the optical sensor 113 in the foregoing state (S13).

Subsequently, the control unit 106 detects a red component of the external light. The control unit 106 turns ON the liquid crystal cell 124R of all or a part of the R sub pixels, and causes the liquid crystal cells of the sub pixels of other colors to be in an OFF state. In other words, the control unit 106 outputs a red patch image to the liquid crystal panel 105 (S14). The control unit 106 acquires a detection value (first detection value) that is output from the optical sensor 113 in the foregoing state (S15). However, since a value that also contains the infrared light component is detected in this case, the control unit 106 subtracts the detection value of only the infrared light component that was obtained previously from the detection value acquired from the optical sensor 113.

Subsequently, the control unit 106 detects a green component of the external light. The control unit 106 turns ON the liquid crystal cell 124G of all or a part of the G sub pixels, and causes the liquid crystal cells of the sub pixels of other colors to be in an OFF state. In other words, the control unit 106 outputs a green patch image to the liquid crystal panel 105 (S16). The control unit 106 acquires a detection value (first detection value) that is output from the optical sensor 113 in the foregoing state (S17). Similar to S15 above, the control unit 106 subtracts the detection value of only the infrared light component that was obtained previously from the detection value acquired from the optical sensor 113.

Subsequently, the control unit 106 detects a blue component of the external light. The control unit 106 turns ON the liquid crystal cell 124B of all or a part of the B sub pixels, and causes the liquid crystal cells of the sub pixels of other colors to be in an OFF state. In other words, the control unit 106 outputs a blue patch image to the liquid crystal panel 105 (S18). The control unit 106 acquires a detection value (first detection value) that is output from the optical sensor 113 in the foregoing state (S19). Similar to S15 above, the control unit 106 subtracts the detection value of only the infrared light component that was obtained previously from the detection value acquired from the optical sensor 113.

Subsequently, the control unit 106 determines the external light conditions based on the detection values that were acquired from the respective optical sensors 113 when the patch images of black, red, green and blue were output to the liquid crystal panel 105 (S20). The control unit 106 determines the intensity of each color component of the external light from the acquired detection values. As shown in FIG. 8A to FIG. 8D, external light has a unique spectrum depending on its type (LED lighting, incandescent lighting, sunlight or the like). Information of a correspondence relation of this type of external light and spectrum including information of the intensity of each color component of the external light is stored in advance in the storage device 107. The control unit 106 reads the correspondence relation information from the storage device 107 and compares it with the detected intensity of each color component of the external light, and thereby determines the type of external light.

In this embodiment, while a plurality of optical sensors 113 are provided on the light source substrate 101, one optical sensor or multiple optical sensors among such plurality of optical sensors 113 may be used for the detection. When a plurality of optical sensors 113 are used, the detection results may be averaged. Note that, while this embodiment illustrated a configuration where the image display device 100 comprises a plurality of optical sensors 113, the number of optical sensors 113 to be provided to the image display device 100 may also be one optical sensor 113.

FIG. 7 shows an example of the detection values of the optical sensor 113 upon actually detecting various types of external light.

An infrared light component, a red component, a green component, and a blue component of the external light can be respectively detected from the detection values of the optical sensors 113 when the liquid crystal panel 105 is driven based on the respective conditions shown in FIG. 6. For example, when LED lighting (daylight color) is detected, the blue component is high, and the infrared light component is extremely low. This is because, as evident from the spectrum of the LED lighting (daylight color) shown in FIG. 8A, an LED lighting has a high peak with blue, and hardly emits infrared light. Since the spectrum of a fluorescent lamp a similar to the spectrum of LED lighting, similar detection values are also obtained.

Figure 8A:
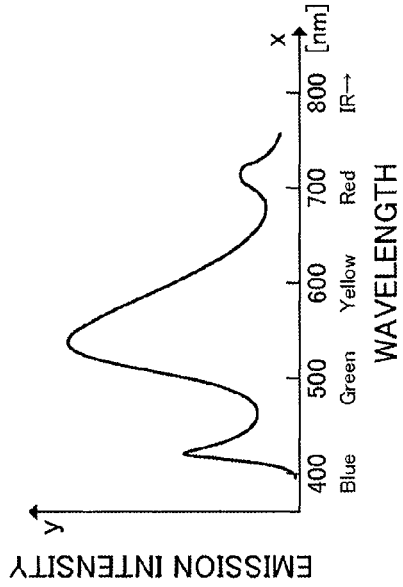
FIG. 8A to FIG. 8D are graphs showing an example of the spectrums of external light of Embodiment 1.
Figure 8B:
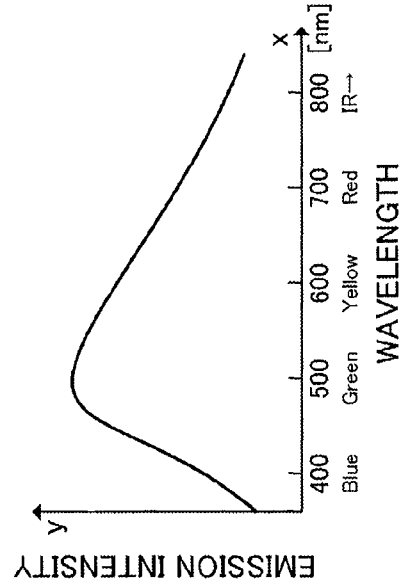

FIG. 8B shows the spectrum of LED lighting (light bulb color). With regard to the detection value, the red component is high, and the infrared light component is extremely low.

Figure 8C:
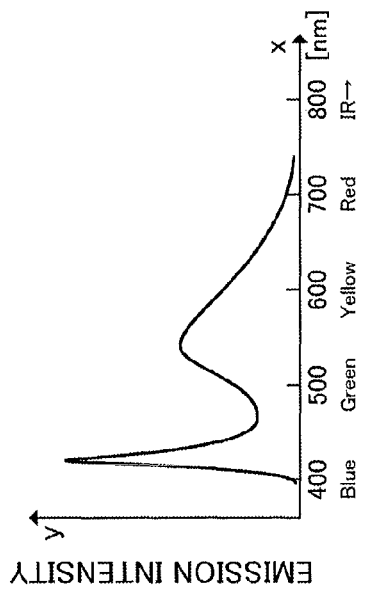

FIG. 8C shows the spectrum of incandescent lighting (light bulb). With regard to the detection value, while the red component is high, the infrared light component is even higher.

Figure 8D:
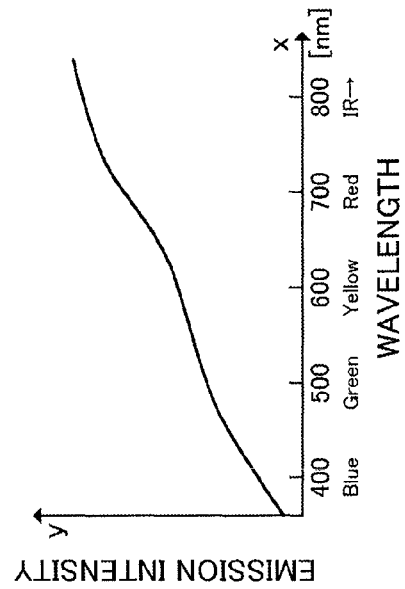

FIG. 8D shows the spectrum of sunlight. While the spectrum, of sunlight will differ considerably depending on the condition (morning, noon, evening), with regard to the detection value in this case, the green component is high, and the infrared light component is also rather high.

By pre-storing, in the storage device 107, information regarding the spectrum for each type of lighting and information regarding the typical values and characteristics of the detection values of the respective color components, and referring to such information, it is possible to determine the type of environmental light based on the detection results from the optical sensors 113 upon displaying the respective color patches.

Here, while the respective color components of external light were detected, the luminance can also be calculated by adding the detection results at a ratio that is in accordance with the visibility characters of the human eye.

Since the sensitivity of the human eye changes by adapting to the external light, a more appropriate display is possible by adjusting the color, brightness and other factors of the image displayed by the image display device in accordance with the detection results of the detected color, luminance and type of external light.

Accordingly, by applying this embodiment, it is possible to detect the environmental light (external light) with existing members of the image display device without having to provide an external light sensor to the image display device.

Embodiment 2

The image display device according to Embodiment 2 of the present invention is now explained. Embodiment explained that the color, luminance and type of external light can be detected based on the detection values from the optical sensors 113 in a state of displaying the patches of the respective colors of black, red, green, and blue on the liquid crystal panel 105. This embodiment explains that it is possible to detect the incident direction of the external light. Note that the same members as Embodiment 1 are given the same reference numeral, and the explanation thereof is omitted.

Figure 9A:
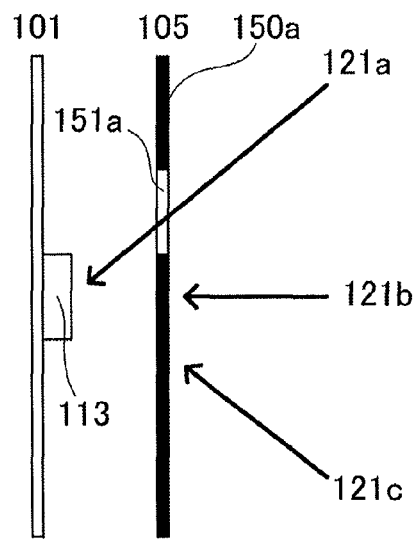
FIG. 9A to FIG. 9D are cross sections showing an example of the image display device of Embodiment 2.
Figure 9B:
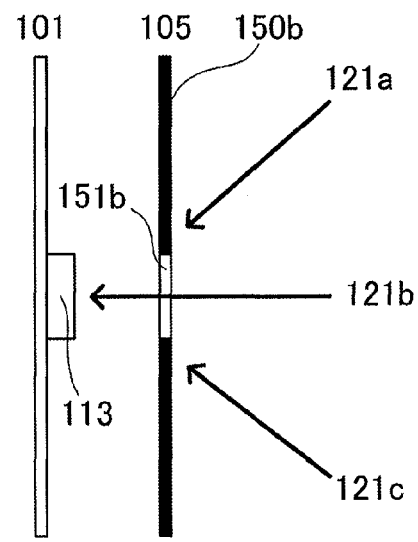
Figure 9C:
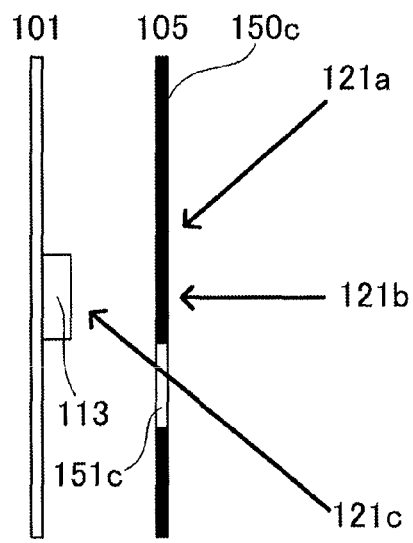
Figure 9D:
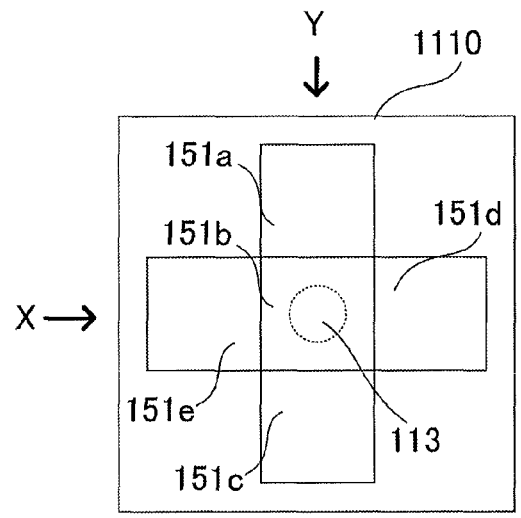
Figure 15:
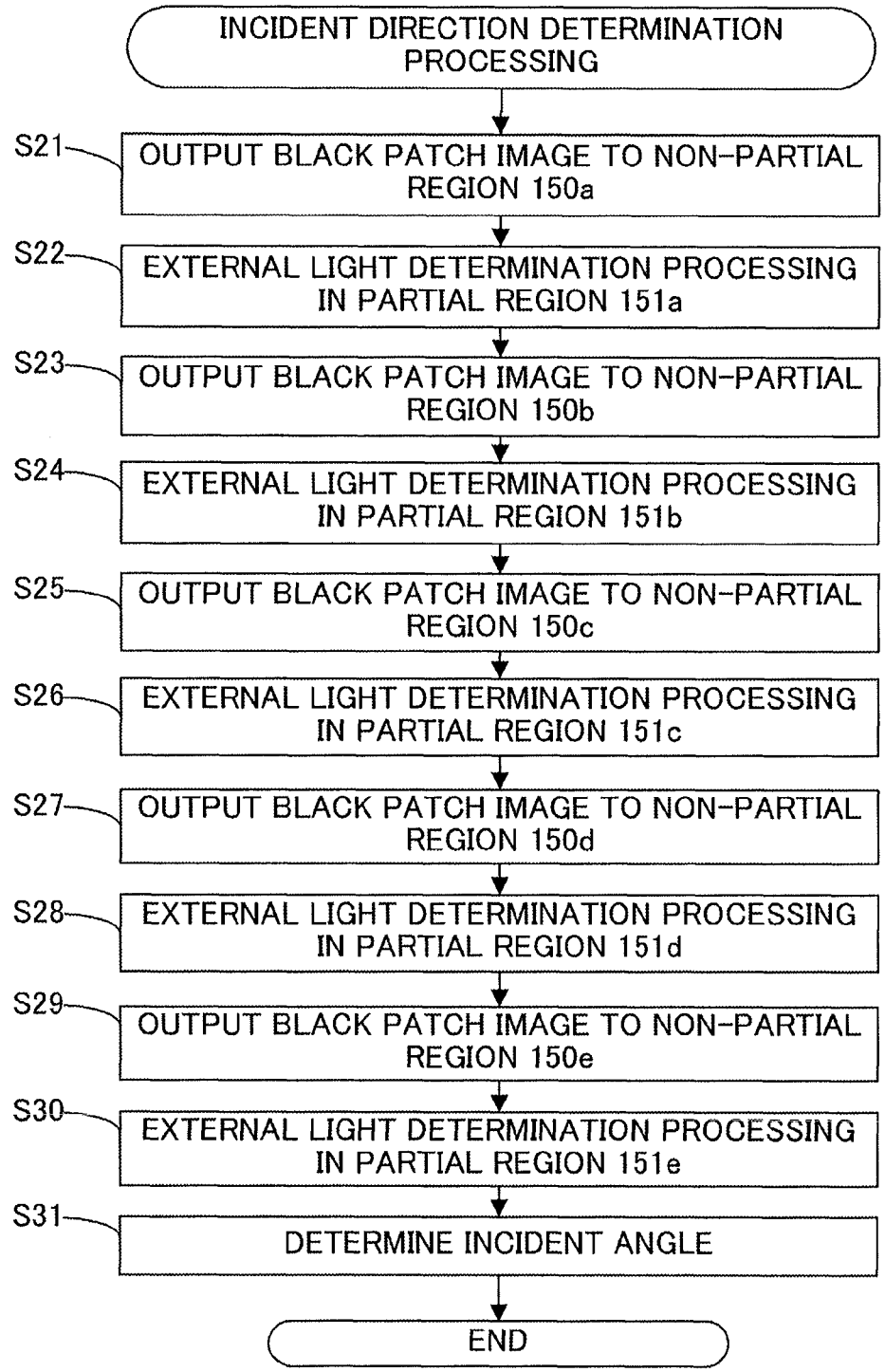
FIG. 15 is a flowchart of the external light incident direction determination processing of Embodiment 2.

FIG. 9A to FIG. 9D are diagrams showing the control method upon detecting the incident direction of external light, wherein FIG. 9A to FIG. 9C are cross sections viewing the image display device from a lateral direction, and FIG. 9D is a diagram showing a front view thereof. Moreover, FIG. 15 is a flowchart of the incident direction determination processing of external light in this embodiment to be executed by the control unit 106. The incident direction determination processing of external light in this embodiment is now explained with reference to the foregoing diagrams.

FIG. 9A is a diagram showing a state of detecting external light that enters from an upper oblique direction of the image display device. The light source substrate 101 is equipped with an optical sensor 113, and detects the external light that enters from the direction of the liquid crystal panel 105. The liquid crystal panel 105 is disposed in parallel with the light source substrate 101 and at a given interval from the light source substrate 101.

The control unit 106 displays a patch image, by applying the control method explained with reference to FIG. 6, in a pixel group 151*a* (partial region) positioned obliquely above the optical sensor 113 in the liquid crystal panel 105, and uses the optical sensor 113 to detect the respective color components of the external light (S22). Here, the control unit 106 performs control of turning OFF all pixels (displaying a black patch image) regarding the pixel group 150*a* (outside the partial region) other than the pixel group 151*a* (S21).

Based on the foregoing control, it is possible to detect external light 121*a* that enters from the upper oblique direction of the image display device 100. However, with regard to infrared light, since it is transmitted from both the pixel group 151*a* and the pixel group 150*a*, it is not possible to detect only the infrared light that enters from the upper oblique direction. As a configuration for detecting only the infrared light from the upper oblique direction, the BM 123 may be configured from a member that that does not transmit infrared light to achieve a pixel configuration including red, green and blue sub pixels and sub pixels provided with the color filters that transmit only infrared light.

FIG. 9B is a diagram showing a state of detecting external light that enters from a front direction of the image display device. Similar to FIG. 9A, the control unit 106 displays a patch image, by applying the control method explained with reference to FIG. 6, in a pixel group 151b (partial region) positioned in front of the optical sensor 113, and uses the optical sensor 113 to detect the respective color components of the external light (S24). The control unit 106 performs control of turning OFF all pixels (displaying a black patch image) regarding the pixel group 150b (outside the partial region) other than the pixel group 151b (S23).

FIG. 9C is a diagram showing a state of detecting external light that enters from a lower oblique direction of the image display device. Similar to FIG. 9A and FIG. 9B, the control unit 106 displays a patch image, by applying the control method explained with reference to FIG. 6, in a pixel group 151c (partial region) positioned obliquely below the optical sensor 113, and uses the optical sensor 113 to detect the respective color components of the external light (S26). The control unit 106 performs control of turning OFF all pixels (displaying a black patch image) regarding the pixel group 150c (outside the partial region) other than the pixel group 151c (S25).

In the foregoing processing, as shown in FIG. 9D, a plurality of partial regions 151a, 151b, 151c having a different positional relation with the optical sensor 113 are set in the display region of the liquid crystal panel 105. In addition, in a state where the respective pixels of the liquid crystal panel 105 are controlled so that light is transmitted only through one of partial regions, it is possible to determine the incident angle of the external light based on the detection value (third detection value) output from the optical sensor 113, and the position relation of the partial region and the optical sensor 113. This partial region may be set to the entire display region of the liquid crystal panel 105, or be set for each divided region 1110 of the liquid crystal panel corresponding to the respective light sources 111. When the partial region is set to the entire display region of the liquid crystal panel 105 in order to determine the incident direction of the external light, it is possible to determine from which direction the external light is entering the overall image display device 100. When the partial region is set to the respective divided regions 1110 in order to determine the incident direction of the external light for each divided region, it is possible to determine from which direction and at which position of the screen the external light enters under circumstances such as when the influence of external light is locally strong due to a spotlight or the like. Thus, it is possible to individually detect the external light that enters from various angles, from obliquely upward to obliquely downward, of the image display device 100.

The cross sections of FIG. 9A to FIG. 9C are cross sections viewing the image display device 100 from a horizontal direction (X direction of FIG. 9D). Nevertheless, when deeming FIG. 9A to FIG. 9C to be cross sections viewing the image display device 100 from a vertical direction (Y direction of FIG. 9D), it can be understood that it is also possible to individually detect the external light that enters from obliquely leftward, front or obliquely rightward based on control that is similar to the control described above. In the foregoing case, a plurality of partial regions having a different position relation with the optical sensor 113 become the partial regions 151b, 151d, 151e shown in FIG. 9D. The control unit 106 performs the same processing as the processing described above also for the partial regions 151d, 151e (S27 to S30). Thus, according to this embodiment, it is also possible to detect external light that enters from obliquely upward, downward, leftward, rightward and front of the display surface of the image display device. The control unit 106 determines the incident direction of the external light from the detection values of the external light that enters from each of the foregoing directions (S31). This determination method is now explained in detail.

Figure 10A:
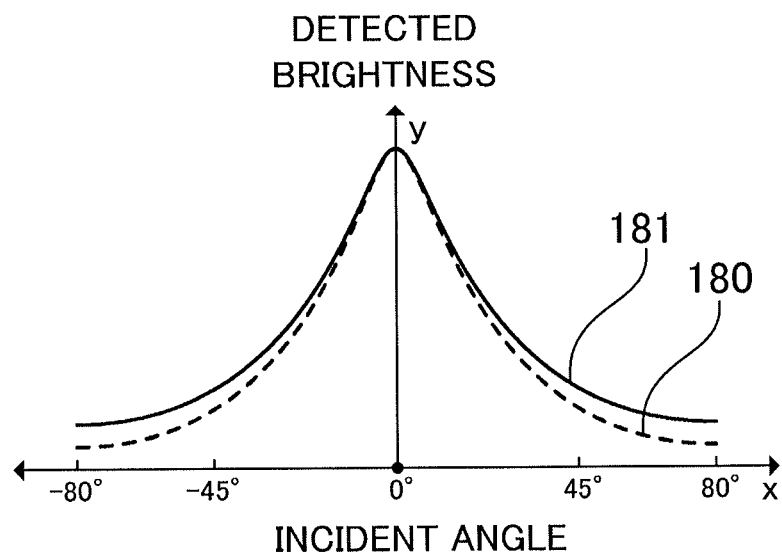
FIG. 10A and FIG. 10B are graphs showing an example of the optical sensor detection values of Embodiment 2.

FIG. 10A is an example of a graph showing the detection result in a case where the external light enters from the front direction of the image display device.

As external light that enters from the front direction, considered may be sunlight that enters from the window.

The x axis is the incident angle of the external light and, here, may be considered to be incident angle of the vertical direction or the incident angle of the horizontal direction. The y axis indicates the detected brightness.

When the control explained with reference to FIG. 9A to FIG. 9D is performed, it is possible to detect the brightness of external light for each incident angle. A plot 180 is one example thereof. Drawn is a curve having a peak at the front direction (0°), and which gradually becomes smaller as the angle becomes greater.

A plot 181 is a result of correcting the detection result of the plot 180 by giving consideration to the directional characteristics of sensitivity of the optical sensor 113, and the angular dependence (view angle) of the liquid crystal transmittance.

The sensitivity of the optical sensor 113 and the liquid crystal transmittance both have characteristics of being the highest at the front direction (0°), and decreasing as the angle becomes greater. Accordingly, the plot 181 is a result of correcting the plot 180 so that the gain is increased as the angle becomes greater.

Figure 10B:
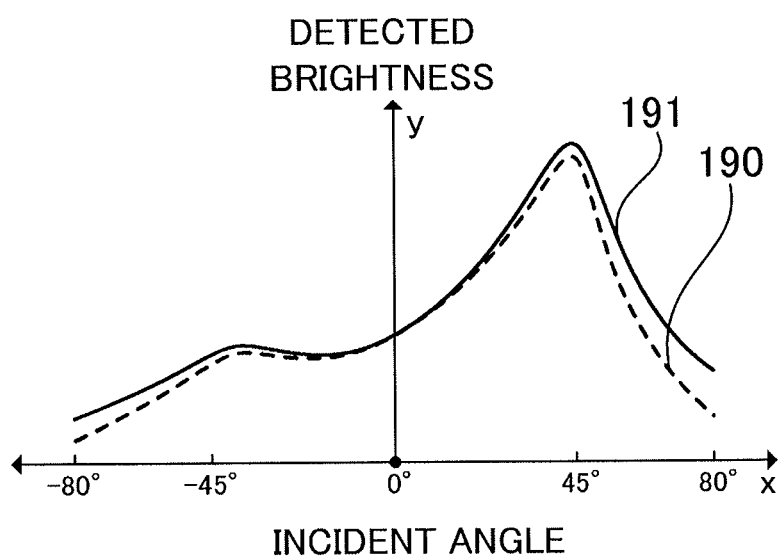

FIG. 10B is an example of a graph showing the detection result in a case where the external light enters from the upper oblique direction of the image display device.

As external light that enters from the upper oblique direction, considered may be lighting or the like mounted on the ceiling.

The x axis is the incident angle (vertical) of the external light. The y axis indicates the detected brightness. A plot 190 shows an example of the detected brightness for each incident angle. Drawn is a curve having a peak at the upper oblique direction (45°), and in which from there the detected brightness decreases as the angle becomes greater. While a small peak can also be seen in the lower oblique direction (−45°), this is considered to be a result of the light from the lighting mounted on the ceiling being reflected off the floor and entering the image display device.

Similar to the plot 181 of FIG. 10A, a plot 191 is a result of correcting the detection result of the plot 190 by giving consideration to the directional characteristics of sensitivity of the optical sensor 113, and the angular dependence (view angle characteristics) of the liquid crystal transmittance.

When a notable peak is not detected unlike the cases shown in FIG. 10A and FIG. 10B, it is considered that external light entered from the rear of the image display device, and was indirectly detected after being reflected off the wall or floor.

By detecting the incident direction of the external light as described above, for example, it becomes possible to perform corrections relative to the adaptation of the eyes to the external light with greater precision in comparison to conventional technologies.

With conventional technologies, the color and brightness of the image to be displayed on the image display device were adjusted only in accordance with the size of the detection value of the external light sensor without giving any consideration to the incident direction of the external light. Nevertheless, since the adaptation level of the eyes to the external light will change depending on the incident direction of the external light (position of lighting), it is desirable to make adjustments in consideration of the incident direction of the external light. This adjustment will be explained in detail later.

Figure 11A:
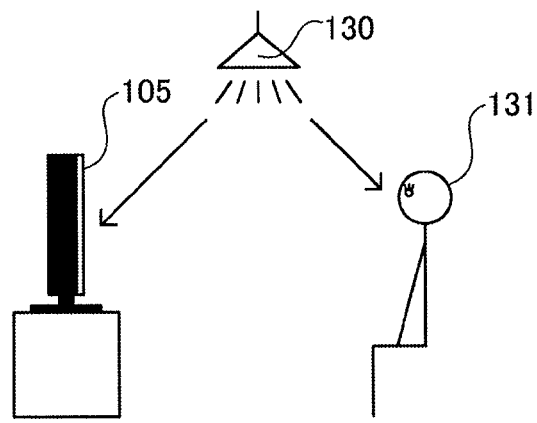
FIG. 11A to FIG. 11C are diagrams showing an example of the relation between the position of the lamp and the adaptation level of the eyes of Embodiment 2.
Figure 11B:
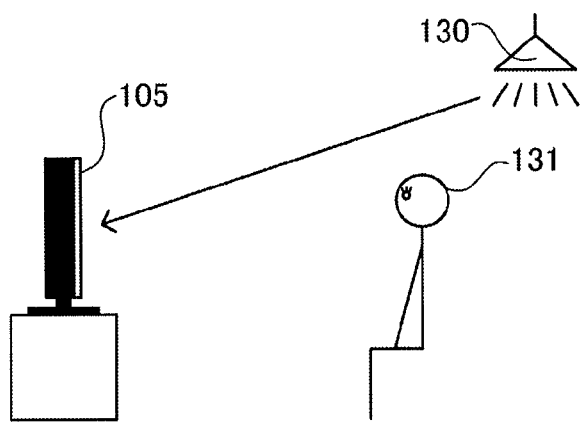
Figure 11C:
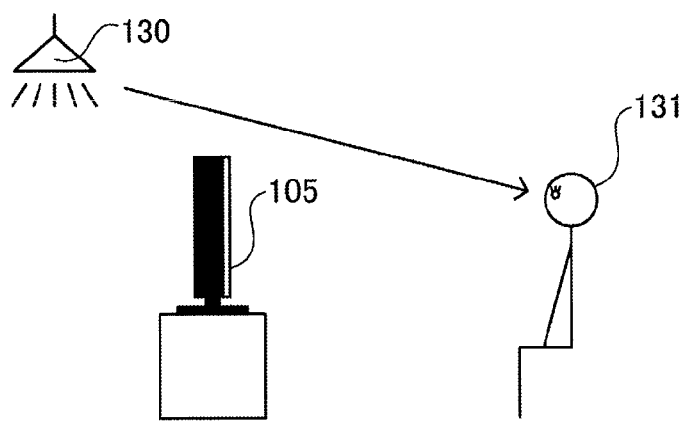

FIG. 11A to FIG. 11C are diagrams explaining the relation of the position of the lighting mounted on the ceiling and the adaptation level of the eyes to the external light.

FIG. 11A shows a case where a lamp 130 is positioned upward approximately at the center between the image display device (liquid crystal panel 105) and a user 131. The user 131 is viewing the image of the liquid crystal panel 105.

External light enters the liquid crystal panel 105 from an upper oblique direction, and is detected by an external light sensor disposed on the bezel part or the optical sensor 113 in the backlight device. External light also enters the eyes of the user 131 from an upper oblique direction, and the eyes of the user 131 adapt to the color and luminance of the lighting.

FIG. 11B shows a case where the lamp 130 is positioned behind the user 131.

While the distance to the lamp 130 is farther than in the case of FIG. 11A, external light enters the liquid crystal panel 105 from an upper oblique direction, and is detected by an external light sensor disposed on the bezel part or the optical sensor 113 in the backlight device. External light does not directly enter the eyes of the user 131 from the lamp 130 positioned behind the user 131, and external light only indirectly enters the eyes of the user 131 after being reflected off the wall or floor. Thus, the eyes of the user 131 do not adapt that much to the color or luminance of the lamp 130.

FIG. 11C shows a case where the lamp 130 is positioned behind the image display device (liquid crystal panel 105).

Since external light from the lamp 130 positioned behind the liquid crystal panel 105 does not directly enter the liquid crystal panel 105, and external light only indirectly enters the liquid crystal panel 105 after being reflected off the wall or floor, external light is not detected that much by the external light sensor disposed on the bezel part or the optical sensor 113 in the backlight device. While the distance to the lamp 130 is farther than in the case of FIG. 11A, external light enters the eyes of the user 131 from an upper oblique direction, and the eyes of the user 131 adapt to the color and luminance of the lighting.

Consequently, since the adaptation level of the eyes to the external light will change depending on the incident direction of the external light (position of lighting), it can be understood that it is desirable to make adjustments of the display image in consideration of the incident direction of the external light. According to this embodiment, the display image can be adjusted according to the incident direction of the external light since the incident direction of the external light can be detected.

For example, when the position of the lighting is an upper oblique direction of the image display device, as the position of the lighting approaches the front surface of the image display device, the gain for adjusting the color and brightness of the color according to the sensor detection value is lowered.

Moreover, when it is determined that the position of the lighting is behind the image display device, the gain for adjusting the color and brightness of the color according to the sensor detection value is increased.

In this embodiment, it is also possible to perform control of offering assistance when the user is to mount a shading hood on the image display device based on the detection result of the external light incident direction. For example, provided is a display for guiding the mounting of the shading hood according to the external light incident direction, and proposing the model number of the shading hood with an appropriate flange shape and length.

In this embodiment, when the image display device includes a rolling mechanism for changing the vertical/horizontal direction of the screen, it is possible to detect the facing direction of the screen of the image display device based on the detection result of the external light incident direction. Generally speaking, once an image display device is installed, since the positional relation of the lighting relative to the image display device will not change, it is possible to detect the change in the facing direction of the screen upon detecting the change in the external light incident direction caused by the lighting.

In this embodiment, it is possible to perform control of detecting the reflected status of the external light on the surface of the liquid crystal panel 105, and correct the image to be displayed on the liquid crystal panel 105 so as to alleviate the interference in accordance with the reflected status.

As shown in FIG. 2, the light source substrate 101 is provided with a plurality of optical sensors 113 so as to cover the entire area of the liquid crystal panel 105. By each of these optical sensors 113 performing the processing of detecting the color, luminance, and incident direction of the external light as described above, it is possible to determine the incident condition of the external light for each divided region, which is obtained by dividing the display region of the liquid crystal panel 105 into a plurality of regions, corresponding to each of the respective light sources 111. Consequently, for example, it is possible to detect circumstances such as when the influence of external light is locally strong on the surface of the liquid crystal panel 105 due to a spotlight or the like. The display image of the position corresponding to the position of the optical sensor 113 is corrected based on the external light incident condition that is detected for each position (for each divided region) of the optical sensor 113. This correction may also be performed by giving consideration to the surface treatment (AR: Anti-Reflection treatment, AG: Anti-Glare treatment) that was performed to the surface of the liquid crystal panel 105.

Figure 12A:
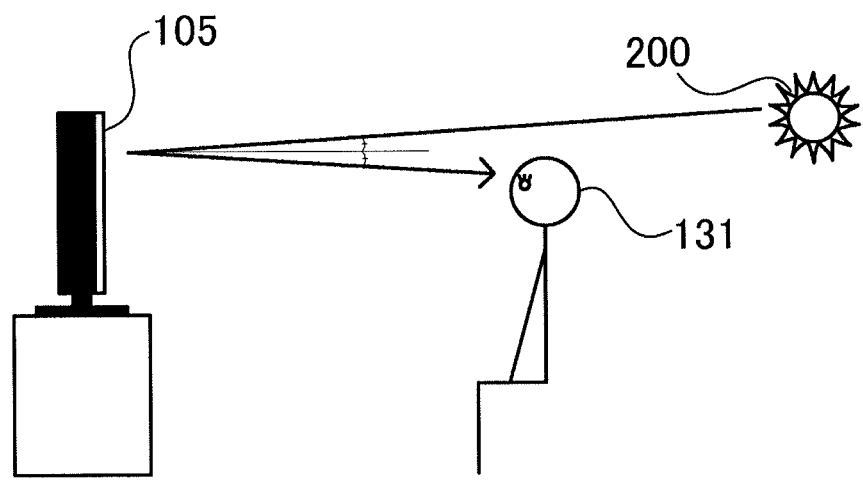
FIG. 12A and FIG. 12B are diagrams showing an example of the reflected state of external light on the surface of the liquid crystal panel of Embodiment 2.

FIG. 12A shows an example of the reflected state of the external light on the surface of the liquid crystal panel 105 when AR treatment has been performed.

When AR treatment is performed, external light is mirror-reflected off the surface of the liquid crystal panel 105. Accordingly, when the incident angle of the external light just happens to be in a relation which is mirror-reflected to the eyes of the user 131, the user will be subject to strong interference (glare) caused by the reflection of the external light. For example, considered may be a case where light from the sun 200 enters from a window. In response, according to this embodiment, it is possible to correct the contrast, gamma, color and other factors of the image for each divided region so as to alleviate the sense of interference based on the detected incident angle of the sunlight, and information regarding the surface treatment (AR treatment).

Figure 12B:
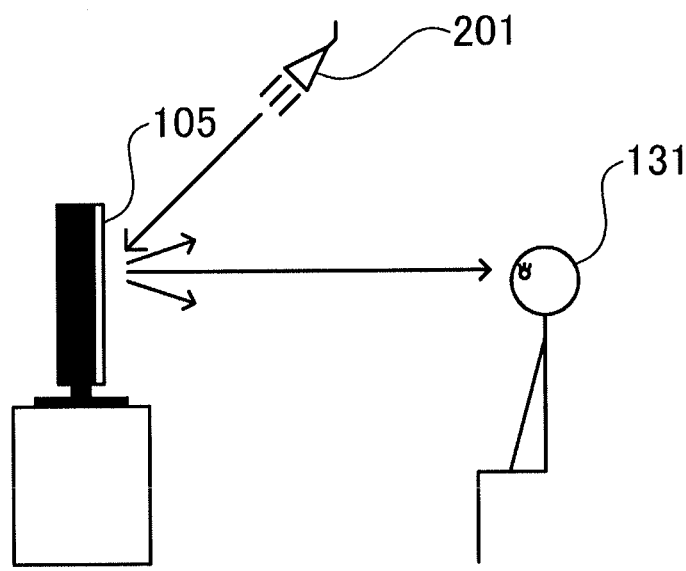

FIG. 12B shows an example of the reflected state of the external light on the surface of the liquid crystal panel 105 when AG treatment has been performed.

When AG treatment is performed, external light external light is diffuses and reflected off the surface of the liquid crystal panel 105. Accordingly, even when the incident angle of the external light is not in a relation which is diffused and reflected to the eyes of the user 131, the user will be subject to interference (misadjusted black level) caused by the reflection of the external light. For example, considered may be a case where light from the spotlight 201 mounted on the ceiling enters. In response, according to this embodiment, it is possible to correct the contrast, gamma, color and other factors of the image for each divided region so as to alleviate the sense of interference based on the detected incident angle of the spotlight 201, and information regarding the surface treatment (AG treatment).

In the foregoing explanation, a state where the liquid crystal cells are turned ON is a state where the optical transmittance of the liquid crystal cells (liquid crystal elements) is maximum. Moreover, a state where the liquid crystal cells are turned OFF is a state where the optical transmittance of the liquid crystal cell (liquid crystal element) is minimum. Light is not necessary blocked completely even when the optical transmittance is made to be minimum, and there are cases where a certain amount of light is transmitted. For example, when a red patch image is displayed and only the liquid crystal cells of the red sub pixels are turned ON, and the liquid crystal cells of the sub pixels of other colors are turned OFF, ideally only the light of the red pixels is transmitted. However, there are cases where light of colors other than red is also slightly transmitted due to the characteristics of the liquid crystal panel. In this kind of case also, the liquid crystal panel can obtain the relative intensity of the red component of the external light from the detection value that is output from the optical sensor in the foregoing state since the transmittance of light of other colors will be sufficiently smaller than the transmittance of red light. It is also possible to measure in advance the intensity of the light that is transmitted in a state where the optical transmittance of the liquid crystal cells is minimum, and subtract the same from the detection value that is output from the optical sensor. Also in cases of turning ON the pixels of one partial region among a plurality of partial regions and turning OFF the pixels other than the one partial region, ideally only the light of the one partial region is transmitted, but there are cases where light of other pixels is also slightly transmitted.

Note that, a state where the liquid crystal cells are ON is not limited to a state in which the transmittance is maximum, and a state where the liquid crystal cells are OFF is not limited to a state in which the transmittance is minimum. It will suffice so as long as the transmittance in a state where the liquid crystal cells are OFF is sufficiently smaller than the transmittance in a state where the liquid crystal cells are ON. It will suffice so as long as the difference in transmittance is of a level that enables the estimation of the relative intensity of one color in the spectrum of the incident light based on the detection value that is detected by the optical sensor in a state where the pixels of one color among the plurality of colors of red, green, and blue are turned ON, and the pixels of colors other than the one color are turned OFF.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-144897, filed on Jul. 10, 2013, and Japanese Patent Application No. 2014-121458, filed on Jun. 12, 2014, which are hereby incorporated by reference herein in their entirety.

What is claimed is:

1. An image display device, comprising:
   a light-emitting unit;
   a display panel including color filters of a plurality of colors and pixels corresponding to the respective color filters;
   a sensor which detects light from the light-emitting unit and light incident from outside that passes through the display panel;
   a control unit configured to acquire, in a state where the display panel is controlled so that transmittance of pixels of one color among the plurality of colors is greater than transmittance of pixels of colors other than the one color, a detection value that is output from the sensor as a first detection value of the one color, and configured to determine an irradiation condition of external light based on the first detection value of each color of the plurality of colors.

2. The image display device according to claim 1, wherein the control unit acquires the detection value that is output from the sensor as the first detection value of the one color in a state where the display panel is controlled so that the transmittance of the pixels of the one color among the plurality of colors is greater than the transmittance of pixels of colors other than the one color, and in a state where the light-emitting unit is controlled so as not to emit light.

3. The image display device according to claim 1, wherein, when the first detection value is acquired by the control unit, the display panel is controlled so that the transmittance of the pixels of colors other than the one color is smallest.

4. The image display device according to claim 1, further comprising:
   a storage unit configured to store information relating to a correspondence relation between a type of external light, and a spectrum including information on at least an intensity of each color component of the plurality of colors of the external light, wherein the control unit determines the type of external light based on the first detection value of each color of the plurality of colors, and the correspondence relation information.

5. The image display device according to claim 1, wherein the display panel includes a black matrix that transmits infrared light without transmitting visible light, the control unit acquires a detection value that is output from the sensor as a second detection value of the infrared light in a state where the display panel is controlled so that the transmittance of pixels of all colors of the plurality of colors is smallest, and the control unit determines the irradiation condition of the external light based on the second detection value of the infrared light, and the first detection value of each color of the plurality of colors.

6. The image display device according to claim 5, wherein the control unit acquires the detection value that is output from the sensor as the second detection value in a state where the display panel is controlled so that the transmittance of pixels of all colors of the plurality of colors is smallest, and in a state where the light-emitting unit is controlled so as not to emit light.

7. The image display device according to claim 1, wherein the display panel further includes color filters that transmit infrared light and pixels corresponding to the color filters, the control unit acquires the detection value that is output from the sensor as the second detection value in a state where the display panel is controlled so that the transmittance of the pixels corresponding to the infrared light is greater than the transmittance of pixels other than the pixels corresponding to the infrared light, and the control unit determines the irradiation condition of external light based on the second detection value, and the first detection value of each color of the plurality of colors.

8. The image display device according to claim 7, wherein the control unit acquires the detection value that is output from the sensor as the second detection value in a state where the display panel is controlled so that the transmittance of the pixels corresponding to the infrared light is greater than the transmittance of pixels other than the pixels corresponding to the infrared light, and in a state where the light-emitting unit is controlled so as not to emit light.

9. The image display device according to claim 7, wherein, when the second detection value is acquired by the control unit, the display panel is controlled so that the transmittance of pixels other than the pixels corresponding to the infrared light is smallest.

10. The image display device according to claim 7, wherein the display panel includes a black matrix that does not transmit visible light and infrared light.

11. The image display device according to claim 5, further comprising:

a storage unit configured to store information relating to a correspondence relation between a type of external light, and a spectrum including information on at least an intensity of each color component and an infrared light component of the plurality of colors of the external light, wherein the control unit determines the type of external light based on the first detection value of each color of the plurality of colors and the second detection value of the infrared light, and the correspondence relation information.

12. The image display device according to claim 1, wherein the control unit acquires, in a state where the display panel is controlled so that transmittance of pixels of one partial region among a plurality of partial regions each having a different positional relation with the sensor and which are set in a display region of the display panel is greater than transmittance of pixels other than the pixels of the one partial region, a detection value that is output from the sensor as a third detection value of the one partial region, and the control unit determines an incident angle of the external light based on the third detection value of each of the plurality of partial regions, and the positional relation between each partial region and the sensor.

13. The image display device according to claim 1, further comprising:

a storage unit configured to store information relating to a correspondence relation between a type of external light, and a spectrum including information on at least an intensity of each color component of the plurality of colors of the external light, wherein the control unit acquires the detection value that is output from the sensor as the third detection value of the one partial region and the one color in a state where the display panel is controlled so that the transmittance of the pixels of the one color among the plurality of colors in one partial region among a plurality of partial regions each having a different positional relation with the sensor and which are set in a display region of the display panel is greater than the transmittance of other pixels, and the control unit determines the type and incident angle of the external light based on the third detection value of each of the plurality of partial regions and each color of the plurality of colors, the positional relation between each partial region and the sensor, and the correspondence relation information.

14. The image display device according to claim 12, wherein the control unit corrects the third detection value based on directional characteristics of sensitivity of the sensor, and view angle characteristics of the transmittance of the pixels of the display panel.

15. The image display device according to claim 12, further comprising:

a guide unit configured to guide mounting of a shading hood, based on an incident angle of the external light determined by the control unit.

16. The image display device according to claim 12, further comprising:

a rolling mechanism rotating a screen; and a detection unit configured to detect, based on a change in the incident angle of the external light determined by the control unit, a change in a facing direction of the screen caused by the rolling mechanism.

17. The image display device according to claim 1, wherein the display panel has a plurality of divided regions, the image display device includes a plurality of sensors, and each sensor is provided at a position corresponding to each of the plurality of divided regions, and the control unit determines the irradiation condition of the external light based on the first detection value that is output from each of the sensors.

18. The image display device according to claim 1, wherein the display panel has a plurality of divided regions, the image display device includes a plurality of sensors, and each sensor is provided at a position corresponding to each of the plurality of divided regions, and the control unit determines, for each of the divided regions, the irradiation conditions of the external light of the respective divided regions based on the first detection values that are output from the sensors corresponding to the respective divided regions.

19. The image display device according to claim 5, wherein the display panel has a plurality of divided regions, the image display device includes a plurality of sensors, and each sensor is provided at a position corresponding to each of the plurality of divided regions, and the control unit determines the irradiation condition of the external light based on the first detection value and the second detection value that are output from each of the sensors.

20. The image display device according to claim 5, wherein the display panel has a plurality of divided regions, the image display device includes a plurality of sensors, and each sensor is provided at a position corresponding to each of the plurality of divided regions, and the control unit determines, for each of the divided regions, the irradiation conditions of the external light of the respective divided regions based on the first detection values and the second detection values that are output from the sensors corresponding to the respective divided regions.

21. A method of controlling an image display device including:

a light-emitting unit;

a display panel including color filters of a plurality of colors and pixels corresponding to the respective color filters; and a sensor which detects light from the light-emitting unit and light incident from outside that passes through the display panel;

the method comprising:

acquiring, in a state where the display panel is controlled so that transmittance of pixels of one color among the plurality of colors is greater than transmittance of pixels of colors other than the one color, a detection value that is output from the sensor as a first detection value of the one color; and determining an irradiation condition of external light based on the first detection value of each color of the plurality of colors acquired in the acquiring.

* * * * *